United States Patent
Fukuda

(10) Patent No.: US 9,183,400 B2
(45) Date of Patent: Nov. 10, 2015

(54) IC CARD AND IC CARD CONTROL METHOD

(71) Applicant: KABUSHIKI KAISHA TOSHIBA, Minato-ku, Tokyo (JP)

(72) Inventor: Aki Fukuda, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 118 days.

(21) Appl. No.: 13/794,991

(22) Filed: Mar. 12, 2013

(65) Prior Publication Data
US 2013/0254904 A1    Sep. 26, 2013

(30) Foreign Application Priority Data

Mar. 21, 2012  (JP) ................................. 2012-063365

(51) Int. Cl.
| | |
|---|---|
| *H04L 29/06* | (2006.01) |
| *G06F 21/00* | (2013.01) |
| *G06F 21/60* | (2013.01) |
| *G06F 21/62* | (2013.01) |
| *G06F 21/79* | (2013.01) |
| *G06F 12/14* | (2006.01) |

(52) U.S. Cl.
CPC ............ *G06F 21/60* (2013.01); *G06F 21/6218* (2013.01); *G06F 21/79* (2013.01); *G06F 2221/2145* (2013.01)

(58) Field of Classification Search
CPC . G06F 21/60; G06F 21/77; G06F 2221/2145; G06F 21/79; G06F 21/6218
USPC ............. 726/30; 711/154; 265/492; 713/169, 713/193
See application file for complete search history.

(56) References Cited

U.S. PATENT DOCUMENTS

| | | | |
|---|---|---|---|
| 2005/0132151 A1* | 6/2005 | Kuriyama | ...................... 711/154 |
| 2007/0075149 A1* | 4/2007 | Yanagida | ...................... 235/492 |
| 2010/0070707 A1* | 3/2010 | Nishimura | ...................... 711/115 |

FOREIGN PATENT DOCUMENTS

| | | | |
|---|---|---|---|
| JP | 2000-155715 A | | 6/2000 |
| JP | 2002-312741 A | | 10/2002 |
| WO | WO 2005031580 A1 | * | 4/2005 |

OTHER PUBLICATIONS

Jun Wang; Xiaoyu Yao; Mitchell, C.; Peng Gu; "A New Hierarchical Data Cache Architecture for iSCSI Storage Server"; Computers, IEEE Transactions on Year: Apr. 2009; vol. 58, Issue: 4; pp. 433-447.*

Office Action mailed on Jul. 21, 2015 in the corresponding JP application No. 2012-063365 (English translation attached).

* cited by examiner

*Primary Examiner* — Andrew Nalven
*Assistant Examiner* — Courtney Fields
(74) *Attorney, Agent, or Firm* — Posz Law Group, PLC

(57) ABSTRACT

According to one embodiment, an IC card includes a communication unit, data memory, selector, and inheriting unit. The communication unit performs data communication with an external apparatus. The data memory stores files managed by a hierarchical. structure, a folder as an upper layer of the files, and information concerning the inheritance of a security status between a plurality of folders. If information indicating the inheritance of a security status from the first folder to the second folder exists, the inheriting unit inherits, even while the second file is selected, the security status established while the first folder is selected.

20 Claims, 6 Drawing Sheets

| CLA | INS | P1 | P2 | Lc | Data | Le |
|---|---|---|---|---|---|---|
| 00 | A4 | 04 | 00 | 03 | A0 00 01 | 00 |
| 401 | 402 | 403 | 404 | 405 | 406 | 407 |

| Tag | Len | Value | | | | | | | | | SW1 | SW2 |
|---|---|---|---|---|---|---|---|---|---|---|---|---|
| 62 | 0A | Tag | Len | Value | | | | | | | 90 | 00 |
| | | B0 | 08 | Tag | Len | Value | Tag | Len | Value | | | |
| | | | | 90 | 03 | A0 00 01 | 91 | 01 | 80 | | | |

IC CARD AND IC CARD CONTROL METHOD

CROSS-REFERENCE TO RELATED APPLICATIONS

This application is based upon and claims the benefit of priority from Japanese Patent Application No. 2012-063365, filed Mar. 21, 2012, the entire contents of which are incorporated. herein by reference.

FIELD

Embodiments described herein relate generally to an IC card, a portable electronic apparatus, and an IC card control method.

BACKGROUND

An IC card manages a plurality of files saved in a memory by using a hierarchical structure. An IC card accesses each file in accordance with an established security status. In a conventional IC card, when a security status is established for a file in an upper layer, the established security status can be inherited to each file in a lower layer belonging to the file in the upper layer. In the conventional IC card, however, a security status established for a given file cannot be inherited to files in a layer higher than that of the given file or to files in the same layer as that of the given layer.

BRIEF DESCRIPTION OF THE DRAWINGS

FIG. 5 is a view showing a configuration example of a response which the IC card according to the embodiment outputs in response to the select command;

DETAILED DESCRIPTION

In general, according to one embodiment, an IC card includes a communication unit, data memory, selector, and inheriting unit. The communication unit performs data communication with an external apparatus. The data memory stores files managed by a hierarchical structure, a folder as an upper layer of the files, and information concerning the inheritance of a security status between a plurality of folders. If the communication unit receives a command requesting the selection of a second folder while a first folder is selected, the selector sets the first folder in an unselected state, and sets the second folder designated by the command in a selected state. If information indicating the inheritance of a security status from the first folder to the second folder exists, the inheriting unit inherits, even while the second file is selected, the security status established while the first folder is selected.

An embodiment will be explained below with reference to the accompanying drawings.

Figure 1:
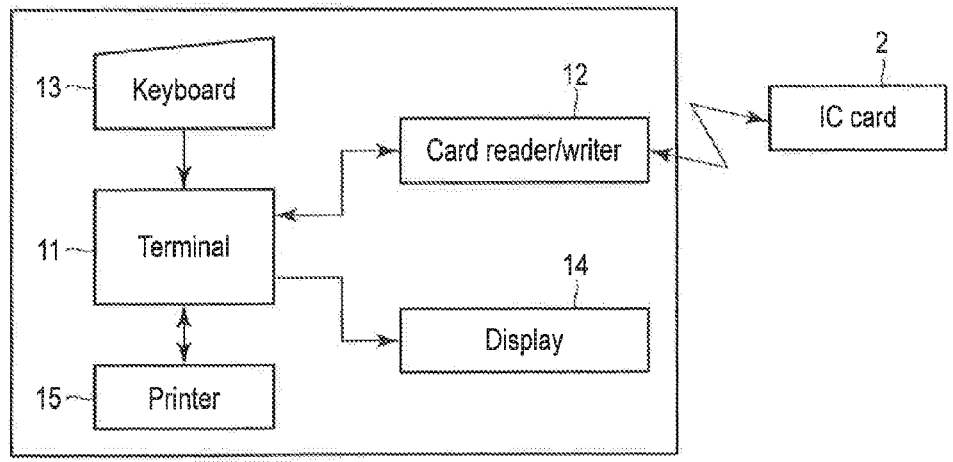
FIG. 1 is a block diagram showing a configuration example of an IC card processor that communicates with an IC card according to an embodiment.

FIG. 1 is a schematic block diagram showing an IC card (portable electronic apparatus) 2 according to the embodiment, and a configuration example of an IC card processor 1 as an external apparatus having a function of communicating with the IC card 2.

First, the arrangement of the IC card processor 1 will be explained.

As shown in FIG. 1, the IC card processor 1 includes a terminal device 11, card reader/writer 12, keyboard 13, display 14, and printer 15.

The terminal device 11 controls the operation of the whole IC card processor 1. The terminal device 11 includes a CPU, various memories, and various interfaces. For example, the terminal device 11 is a personal computer (PC).

The terminal device 11 has, e.g., a function of transmitting commands to the IC card 2 by the card reader/writer 12, and a function of performing various processes based on data received from the IC card 2. For example, the terminal device 11 performs control of writing data in an internal nonvolatile memory of the IC card 2 by transmitting a data write command to the IC card 2 via the card reader/writer 12. Also, the terminal device 11 performs control of reading out data from the IC card 2 by transmitting a read command to the IC card 2.

The card reader/writer 12 is an interface device for communicating with the IC card 2. The card reader/writer 12 is formed by an interface corresponding to the communication system of the IC card 2. For example, when the IC card 2 is a contact-type IC card, the card reader/writer 12 is formed by, e.g., a contact portion for physically and electrically connecting to a contact portion of the IC card 2. Also, when the IC card 2 is a noncontact-type IC card, the card reader/writer 12 is formed by, e.g., an antenna and communication controller for wirelessly communicating with the IC card 2. The card reader/writer 12 performs power supply, clock supply, reset control, and data exchange for the IC card 2. The card reader/writer 12 having these functions activates (starts) the IC card 2, transmits various commands, and receives responses to the transmitted commands, under the control of the terminal device 11.

The keyboard 13 functions as an operation unit to be operated by the operator of the IC card processor 1, and the operator inputs various operation instructions and data on the keyboard 13. The display 14 is a display device for displaying various kinds of information under the control of the terminal device 11. The printer 15 prints out various kinds of data such as processing results.

Next, a configuration example of the IC card 2 will be explained.

The IC card 2 is also called a smart card. The IC card 2 is activated (set in an operable state) by receiving power supply from a host apparatus such as the IC card processor 1. For example, when the IC card 2 is connected to the IC card processor 1 by contact-type communication, i.e., when the IC card 2 is a contact-type IC card, the IC card 2 is activated by receiving the supply of operation power and operation clocks from the IC card processor 1 via the contact portion as a communication interface.

Also, when the IC card 2 is connected to the IC card processor 1 by noncontact-type communication, i.e., when the IC card 2 is a noncontact-type IC card, the IC card 2 receives a radio wave from the IC card processor 1 via, e.g., an antenna and modulator/demodulator as communication interfaces, and activates itself by generating operation power and operation clocks by a power supply unit (not shown) from the radio wave.

Figure 2:
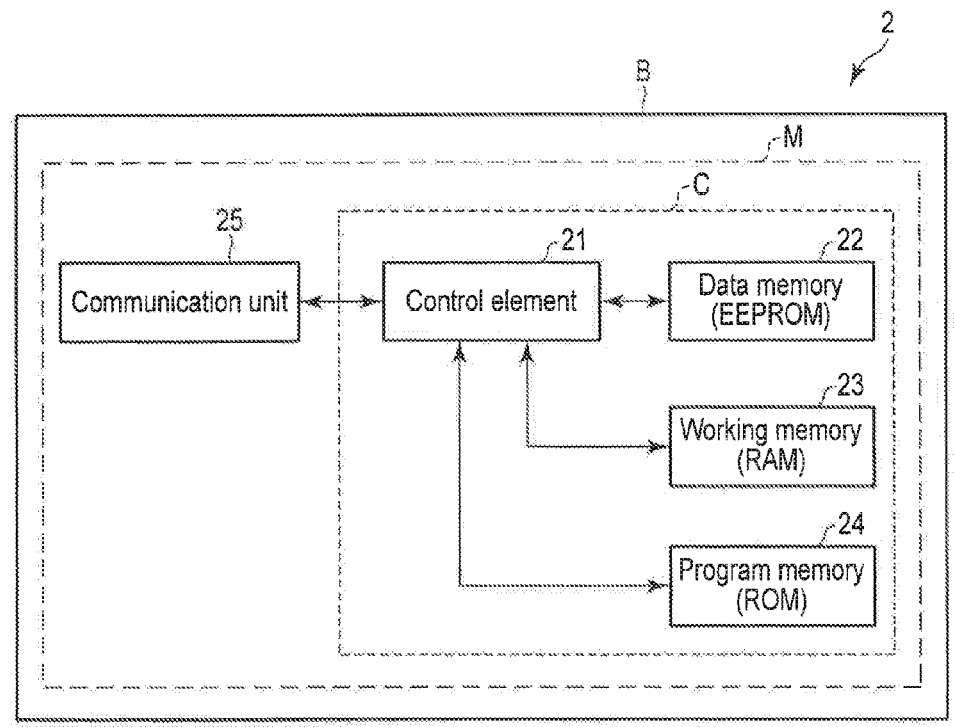
FIG. 2 is a block diagram showing a configuration example of the IC card according to the embodiment.

FIG. 2 is a schematic block diagram showing a hardware configuration example of the IC card 2 according to the embodiment.

The IC card 2 is obtained by incorporating a module M in a card-like housing (main body) B formed by plastic or the like. The module M is integrally formed in a state in which one or a plurality of IC chips C and an external interface (communication interface) for communication are connected, and embedded in the main body B. Also, as shown in FIG. 2, the module M of the IC card 2 includes a control element 21, data memory 22, working memory 23, program memory 24, and communication unit 25.

The control element 21 controls the whole IC card 2. The control element 21 implements various functions by operating based on control programs and control data stored in the program memory 24 or data memory 22. For example, the control element 21 controls the basic operation of the IC card 2 by executing the program of the operating system. Also, the control element 21 controls various operations corresponding to the operation forms of the IC card 2 by executing application programs corresponding to the use purposes of the IC card 2.

The data memory 22 is a nonvolatile memory such as an EEPROM (Electrically Erasable Programmable Read-Only Memory) or flash ROM in which data can be written and rewritten. Control programs or various kinds of data corresponding to the operation purposes of the IC card 2 are written in the data memory 22. Various files corresponding to the standards of the IC card 2 are defined in the data memory 22, and various kinds of data are written in these files. Examples of the files stored in the data memory 22 will be described later.

The working memory 23 is a volatile memory such as a RAM. The working memory (RAM) 23 also functions as a buffer for temporarily saving, e.g., data being processed by the control element 21. Various tables indicating, e.g., the status of access to each file, the status of use of a communication channel, and the status of processing are formed in the working memory 23. Examples of the tables formed in the working memory 23 will be described later.

The program memory 24 is a nonvolatile memory such as a mask ROM in which control programs, control data, and the like are prestored. The program memory (ROM) 24 in which the control programs or control data are stored is incorporated into the IC card 2 when it is manufactured. That is, the control programs or control data stored in the program memory 24 control the basic operation of the IC card 2 and are preinstalled in accordance with the specifications of the IC card 2.

The communication unit 25 is an interface for communicating with the card reader/writer 12 of the IC card processor 1. When the IC card 2 is implemented as a contact-type IC card, the communication unit 25 is formed by a communication controller and contact portion for exchanging signals with the card reader/writer 12 of the IC card processor 1 by physically and electrically contacting the card reader/writer 12. Also, when the IC card 2 is implemented as a noncontact-type IC card, the communication unit 25 is formed by a communication controller such as a modulator/demodulator for wirelessly communicating with the card reader/writer 12 of the IC card processor 1, and an antenna for exchanging radio waves with the card reader/writer 12.

The management structure of files stored in the data memory 22 will now be explained.

The files stored in the data memory 22 of the IC card are managed by a hierarchical structure. For example, in the ISO/IEC 7816-4 as one standard of an IC card, each file stored in the data memory 22 is defined as one of an MF (Master File), DF (Dedicated File), and EF (Elementary File). An MF is equivalent to a root directory. A DF (folder) and EF (data file) are defined as layers below an MF. A DF is equivalent to a directory and functions as a folder. A DF can have a DF and EF as lower layers. With this arrangement, the IC card can manage files by the hierarchical structure having an MF as the uppermost layer. An MF, DF, and EF are selectively used.

Figures 3, 4:
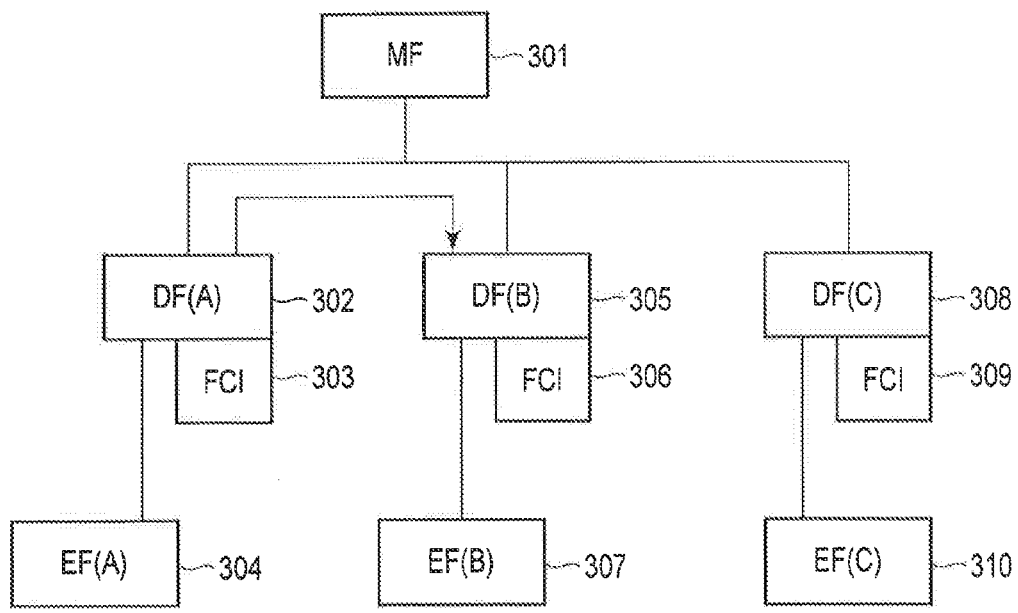
FIG. 3 is a block diagram showing examples of files stored in a data memory of the IC card according to the embodiment.
FIG. 4 is a view showing a configuration example of a select command to be supplied to the IC card of the embodiment.

FIG. 3 is a view showing examples of files managed by the hierarchical structure.

This example shown in FIG. 3 shows the management form of a hierarchical structure for files MF 301, DF (DF(A)) 302, EF (EF(A)) 304, DF (DF(B)) 305, EF (EF(B)) 307, DF (DF(C)) 308, and EF (EF(C)) 310. In the example shown in FIG. 3, the DF(A) 302, DF(B) 305, and DF(C) 308 exist in a layer below the master file (MF) 301 in the uppermost layer.

In addition, the EF(A) 304 exists below the DF(A) 302, the EF(B) 307 exists below the DF(B) 305, and the EF(C) 310 exists below the DF(C) 308. For example, data for implementing one application of the IC card 2 is stored in each DF. In an IC card that implements a plurality of functions by a plurality of applications, a plurality of DFs corresponding to the applications can be formed in the data memory 22.

Also, the DFs 302, 305, and 308 respectively have FCIs (File Control Information) 303, 306, and 309. The FCIs 303, 306, and 309 are control information pertaining to the respective corresponding DFs 302, 305, and 308. For example, information such as the security condition of a corresponding EF is stored in each of the FCIs 303, 306, and 309. Note that the FCI can also be defined by the ISO/IEC 7816-4 as one standard of an IC card.

Next, a configuration example of command data (to be simply referred to as a command hereinafter) to be supplied to the IC card 2 will be explained.

FIG. 4 shows a configuration example of a select command for requesting file selection. FIG. 4 shows a configuration example of a select command defined by the ISO/IEC 7816-3. The select command shown in FIG. 4 complies with the Command Application Protocol Data Unit format defined by the ISO/IEC 7816-3.

In the example shown in FIG. 4, the command includes a "Class byte (CLA)" field 401, "Instruction byte (INS)" field 402, "P1" field 403, "P2" field 404, "Lc" field 405, "Data" field 406, and "Le" field 407. The CLA field 401 and INS field 402 store information indicating the type of command. The P1 field 403 and 92 field 404 store parameters for command processing. The Lc field 405 stores information indicating the length of the Data field 406. The Data field 406 stores data to be used in the command. The Le field 407 stores information for checking the command.

In the select command, for example, pieces of information as shown in FIG. 4 are stored in these fields. The Data field 406 of the select command stores a file name as a selection target. In the example shown in FIG. 4, "A0 00 01" is stored as a DF name in the "Data" field.

The configuration of response data (to be also simply referred to as a response hereinafter) with respect to a command will be explained below.

FIG. 5 is a view showing a configuration example of the response to the select command.

The response includes a data field and status field. The data field of the response stores data indicating, e.g., the execution result of the command, and the status field of the response stores a status indicating the success or failure of processing corresponding to the command.

In the example shown in FIG. 5, the data field of the response is object data having a TLV structure in which an identifier (Tag) 501, length information (Length) 502, and data field (Value) 503 are connected in this order. Also, the data field (the value of parent data) 503 shown in FIG. 5 stores data (child data) containing a tag 511, length 512, and value 513. Furthermore, the value 513 of the child data shown in FIG. 5 stores first data (first grandchild data) containing a tag 521, length 522, and value 523, and second data (second grandchild data) containing a tag 531, length 532, and value 533. Note that the data configuration indicated by 501 to 533 is the configuration of a constructed data object defined by the ISO/IEC 7816-4.

Also, FIG. 5 shows a practical example of the response to the select command. The data fields 501 to 533 shown in FIG. 5 form the FCI of a file selected by the select command. That is, in the example shown in FIG. 5, the tag 501 is the identifier of the FCI of the selected file, the length 502 indicates the whole length of the FCI of the selected file, and the value 503 is real data in the FCI of the selected file. In the example shown in FIG. 5, the value 503 contains data indicating the inheritance of the security condition of the selected file.

For example, the data (first grandchild data) indicated by the tag 521 is TLV data storing information indicating a file as the inheritance source or inheritance destination of the security condition of the selected file. In the example shown in FIG. 5, the tag 521 is the identifier of the first grandchild data. The length 522 is information indicating the length of the succeeding value 523. The value 523 is information (the tag of a DF name) indicating the file as the inheritance source or inheritance destination of the security condition.

The data (second grandchild data) indicated by the tag 531 includes the TLV data 531, 532, and 533 storing data indicating the inheriting condition of the security condition. In the example shown in FIG. 5, the tag 531 is the identifier of the second grandchild data. The length 532 is information indicating the length of the succeeding value 533. The value 533 it information indicating "the inheriting condition of the security condition" for identifying whether to inherit the security condition when verify is performed, inherit the security condition when authentication is performed, or inherit the session key and condition of secure messaging, when inheriting the security condition. For example, the value 533 can be 1-byte data, bit 8 can indicate authentication, bit 7 can indicate verify, and bit 6 can indicate the inheritance of the session key for secure messaging.

Information stored in the working memory 23 after a command is executed will be explained below.

Figure 6:
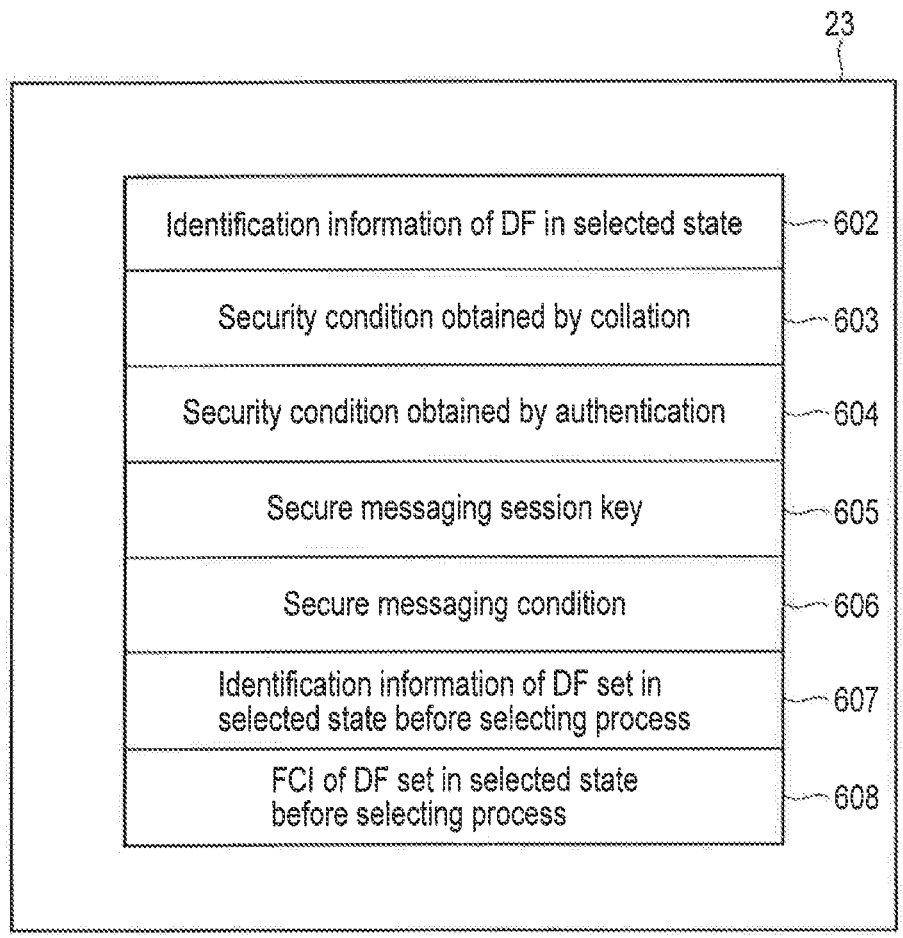
FIG. 6 is a view showing an example of information indicating the selected state and security status of a DF stored in a RAM of the IC card according to the embodiment.

FIG. 6 is a view showing an example of information stored in the working memory 23 after the select command is executed. FIG. 6 shows examples of information indicating the selected state and security status of a DF to be stored in the RAM of the IC card according to the embodiment.

In the example shown in FIG. 6, data 602 to 608 are stored as the execution results of the select command in the working memory (RAM) 23. The data 602 stores information (the file name of a file presently being selected (the DF name of a DF)) indicating a file to be selected by the select command. This information stored in the data 602 is information (DF identification information containing the DF name) indicating the file selected by the select command.

The data 603 stores information indicating the security condition (security status) such as an authority established by verify with an external apparatus (IC card processor). The data 604 stores information indicating the security condition (security status) such as an authority established by authentication with an external apparatus. The data 605 stores information indicating a session key (key information) to be used in secure messaging. The data 606 stores a status (secure messaging execution condition) indicating whether secure messaging can be performed.

The data 607 stores information (DF identification information containing the DF name) indicating a DF (folder) set in the selected state before the selecting process is performed by the select command. The data 608 stores FCI of the DF (folder) set in the selected state before the selecting process is performed by the select command.

A first processing example for the select command in the IC card 2 will be explained below.

Figure 7:
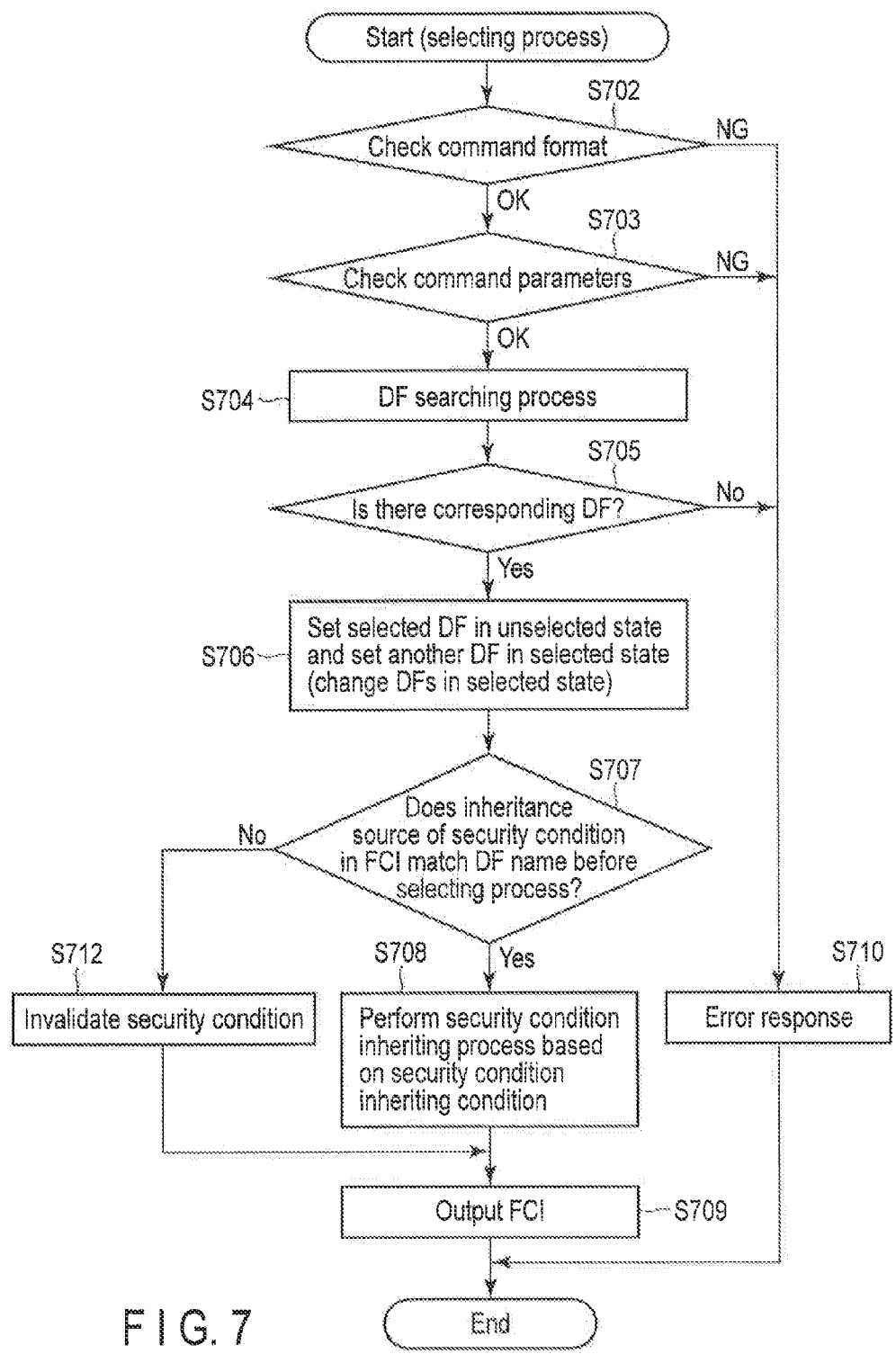
FIG. 7 is a flowchart for explaining a first process example in the IC card according to the embodiment.

FIG. 7 is a flowchart for explaining the procedure of the selecting process for the select command in the IC card 2.

When receiving a command from the IC card processor 1, the control element 21 checks the format of the received command (step S702). If the control element 21 determines that the format of the received command is abnormal (NG in step S702), the control element 21 outputs, as an error response, a response indicating that the format of the command is abnormal (step S710), and terminates the process.

If the control element 21 determines that the format of the received command is normal (OK in step S702), the control element 21 checks the command parameters (step S703), and discriminates the process contents of the received command. For example, the control element 21 of the IC card 2 discriminates the type of the received command by "CLA" and "INS" of the received command, and discriminates the process contents by "P1", "P2", and "Data". If the control element 21 determines that the parameters of the received command are abnormal (NG in step S703), the control element 21 outputs, as an error response, a response indicating that the parameters of the command are abnormal (step S710), and terminates the process.

Assume that the IC card 2 has received a select command requesting the selection of a given DF from the IC card processor 1 by the communication unit 25. If the control element 21 of the IC card 2 has received a select command having normal parameters (OK in step S703), the control element 21 recognizes that the received command is a select command by "CLA" and "INS" of the received command, and starts a selecting process of setting the DF designated by "P1", "P2", and "Data" in the selected state.

As this selecting process for the received select command, the control element 21 performs a process of searching for the DF designated by the select command (step S704). If the control element 21 determines that the designated DF does not exist in the data memory 22 (NO in step S705), the control element 21 outputs, as an error response, a response indicating that the file designated by the command does not exist (step S710), and terminates the process.

If the designated DF is detected (YES in step S705), the control element 21 performs a process of changing DFs in the selected state, as the process of setting the designated DF in the selected state (step S706). That is, the control element 21 updates a DF in the selected state as shown in FIG. 6, thereby setting a DF presently being selected in the unselected state, and setting the DF designated by the command in the selected state.

This DF changing process is implemented by, e.g., updating the information on the RAM 23 as shown in FIG. 6. In the example shown in FIG. 6, the control element 21 updates the identification information of a DF to be set in the selected state to the identification information of the DF designated by the select command in the data 602 indicating a DF in the selected state in the RAM 23, thereby setting the DF designated by the command in the selected state. Also, the control element 21 writes the identification information of a DF in the selected state in the data 607 indicating a DF set in the selected state before the selecting process, thereby setting the DF presently being selected in the unselected state. Furthermore, in the example shown in FIG. 6, the control element 21 writes the FCI of the DF set in the selected state before the selecting process in the data 608.

When completing the DF changing process corresponding to the select command, the control element 21 determines whether the inheritance of the security status is possible even after the DFs in the selected state are changed (step S707). In this first process example, assume that information indicating a DF as the inheritance source of the security condition (security status) is stored in the FCI of each DF. It is also possible to set, in the FCI of each DF, a plurality of pieces of information (e.g., DF names) each indicating a DF as the inheritance source of the security condition (security status). In the first process example, therefore, when completing the DF changing process corresponding to the select command, the control element 21 determines, by the FCI of the DF set in the selected state, whether it is possible to inherit the security status established while a DF set in the selected state before the selecting process is selected (step S707). The control element 21 checks whether information indicating the DF as the security condition inheritance source stored in the FCI of the DF set in the selected state matches the DF set in the selected state before the selecting process.

If the security condition inheritance source in the FCI of the DF set in the selected state matches the DF set in the selected state before the selecting process, i.e., if it is determined that the inheritance of the security status is possible (YES in step S707), the control element 21 performs a security condition inheriting process based on the security condition (security status) inheriting condition stored in the FCI of the DF set in the selected state (step S708). When completing the security condition inheriting process, the control element 21 sets the FCI of the DF set in the selected state in the data field as a response to the received select command, and sets a status indicating normal termination in the status field (SW1 and SW2), thereby forming response data as a response to the received select command. The control element 21 outputs the formed response data to the IC card processor 1 (step S709), and terminates the process.

Also, if the security condition inheritance source in the FCI of the DF set in the selected state does not match the DF set in the selected state before the selecting process, i.e., if it is determined that the inheritance of the security status is impossible (NO in step S707), the control element 21 invalidates the security condition (security status) established before the selecting process (e.g., clears the data 603 to 606 in the RAM 23) (step S712). When invalidating the security condition, the control element 21 sets the FCI of the DF set in the selected state in the data field, and sets a status indicating normal termination in the status field (SW1 and SW2), thereby forming response data as a response to the received select command. The control element 21 outputs the formed response data to the IC card processor 1 (step S709), and terminates the process.

Next, a second process example for the select command in the IC card 2 will be explained.

Figure 8:
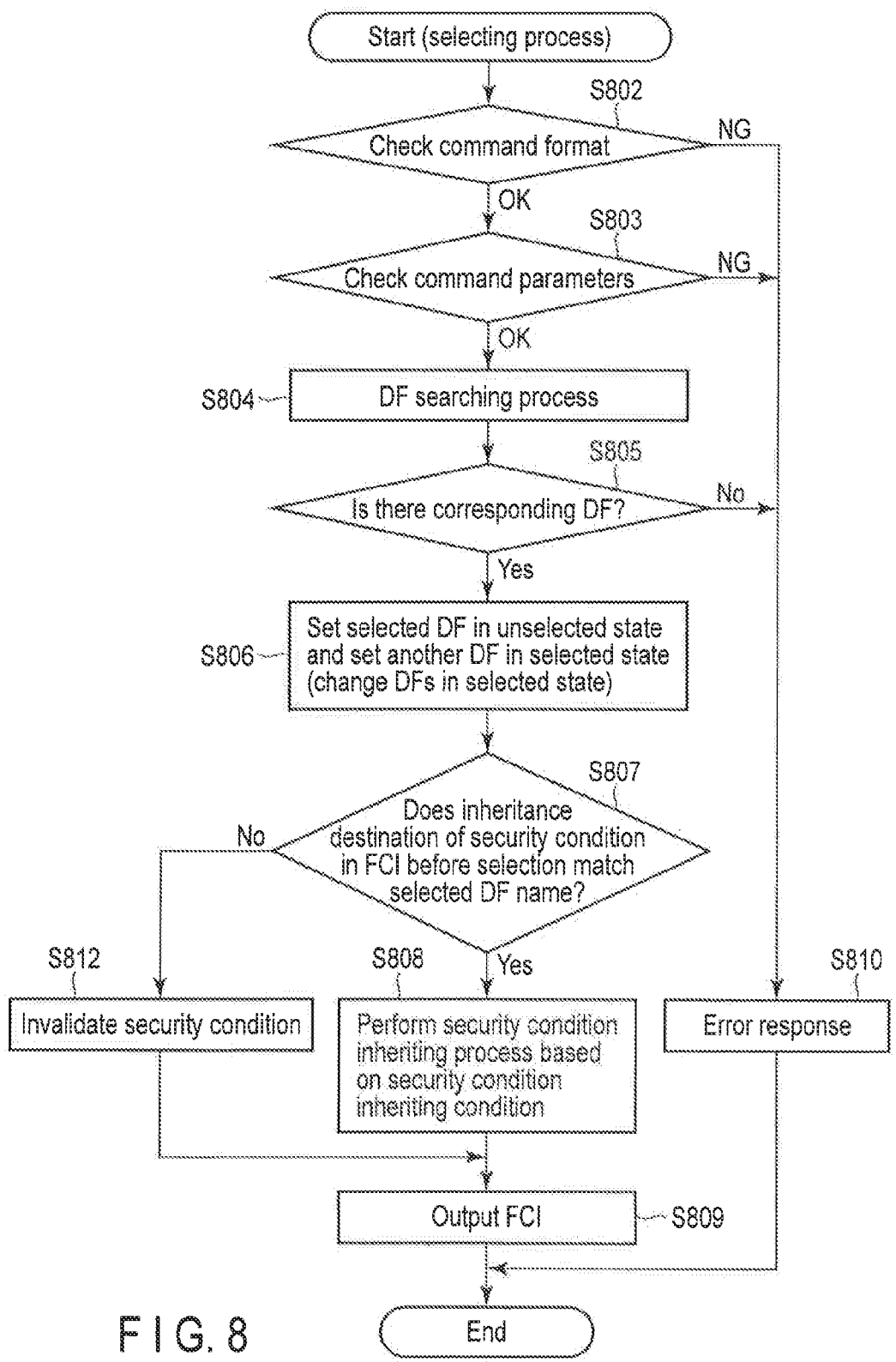
FIG. 8 is a flowchart for explaining a second process example in the IC card according to the embodiment.

FIG. 8 is a flowchart for explaining the procedure of the selecting process for the select command in the IC card 2.

When receiving a command from the IC card processor 1, the control element 21 checks the format of the received command (step S802). If the control element 21 determines that the format of the received command is abnormal (NG in step S802), the control element 21 outputs, as an error response, a response indicating that the format of the command is abnormal (step S810), and terminates the process.

If the control element 21 determines that the format of the received command is normal (OK in steps S802), the control element 21 checks the command parameters (step S803), and discriminates the process contents of the received command. For example, the control element 21 of the IC card 2 discriminates the type of the received command by "CLA" and "INS" of the received command, and discriminates the process contents by "P1", "P2", and "Data". If the control element 21 determines that the parameters of the received command are abnormal (NG in step S803), the control element 21 outputs, as an error response, a response indicating that the parameters of the command are abnormal (step S810), and terminates the process.

Assume that the IC card 2 has received a select command requesting the selection of a given DF from the IC card processor 1 by the communication unit 25. If the control element 21 of the IC card 2 has received a select command having normal parameters (OK in step S803), the control element 21 recognizes that the received command is a select command by "CLA" and "INS" of the received command, and starts a selecting process of setting the DF designated by "P1", "P2", and "Data" in the selected state.

As this selecting process for the received select command, the control element 21 performs a process of searching for the DF designated by the select command (step S804). If the control element 21 determines that the designated DF does not exist in the data memory 22 (NO in step S805), the control element 21 outputs, as an error response, a response indicating that the file designated by the command does not exist (step S810), and terminates the process.

If the designated DF is detected (YES in step S805), the control element 21 performs a process of changing DFs in the selected state, as the process of setting the designated DF in the selected state (step S806). That is, the control element 21 updates a DF in the selected state as shown in FIG. 6, thereby setting a DF presently being selected in the unselected state, and setting the DF designated by the command in the selected state.

This DF changing process is implemented by, e.g., updating the information on the RAM 23 as shown in FIG. 6. In the example shown in FIG. 6, the control element 21 updates the identification information of a DF to be set in the selected state to the identification information of the DF designated by the select command in the data 602 indicating a DF in the selected state in the RAM 23, thereby setting the DF designated by the command in the selected state. Also, the control element 21 writes the identification information of a DF in the selected state in the data 607 indicating a DF set in the selected state before the selecting process, thereby setting the DF presently being selected in the unselected state. Furthermore, in the example shown in FIG. 6, the control element 21 writes, in the data 608, the FCI of the DF set in the selected state before the selecting process.

When completing the DF changing process corresponding to the select command, the control element 21 determines whether the inheritance of the security status is possible even after the DFs in the selected state are changed (step S807). In this second process example, assume that information indicating a DF as the inheritance destination of the security condition (security status) is stored in the FCI of each DF. It is also possible to set, in the FCI of each DF, a plurality of pieces of information (e.g., DF names) each indicating a DF as the inheritance destination of the security condition (security status). In the second process example, therefore, when completing the DF changing process corresponding to the select command, the control element 21 determines, by the FCI of the DF set in the selected state before the selecting process, whether it is possible to inherit the security status established while a DF set in the selected state before the selecting process is selected (step S807), even after the DFs in the selected state are changed. The control element 21 checks whether information indicating the DF as the security condition inheritance destination stored in the FCI of the DF set in the selected state before the selecting process matches the DF set in the selected state.

If the security condition inheritance destination in the FCI of the DF set in the selected state before the selecting process matches the DF set in the selected state, i.e., if it is determined that the inheritance of the security status is possible (YES in step S807), the control element 21 performs a security condition inheriting process based on the security condition (security status) inheriting condition stored in the FCI of the DF set in the selected state (step S808). When completing the security condition inheriting process, the control element 21 sets the FCI of the DF set in the selected state in the data field as a response to the received select command, and sets a status indicating normal termination in the status field (SW1 and SW2), thereby forming response data as a response to the received select command. The control element 21 outputs the formed response data to the IC card processor 1 (step S809), and terminates the process.

Also, if the security condition inheritance destination in the FCI of the DF set in the selected state does not match the DF set in the selected state before the selecting process, i.e., if it is determined that the inheritance of the security status is impossible (NO in step S807), the control element 21 invalidates the security condition (security status) established before the selecting process (e.g., clears the data 603 to 606 in the RAM 23) (step S812). When invalidating the security condition, the control element 21 sets the FCI of the DF set in the selected state in the data field, and sets a status indicating normal termination in the status field (SW1 and SW2), thereby forming response data as a response to the received select command. The control element 21 outputs the formed response data to the IC card processor 1 (step S809), and terminates the process.

In this embodiment as described above, when DFs are changed by executing a select command, it is determined whether the security status of the IC card can be inherited, based on information concerning the inheritance of a preset security condition (security status). If it is determined that the inheritance is possible, the IC card inherits the security status established even after the DFs are changed.

Also, the information concerning the inheritance of the security status is set in the FCI as control information for a DF. In the FCI of a DF, a DF (or a plurality of DFs) as the inheritance source of the security status is designated, or a DF for a plurality of DFs) as the inheritance destination of the security status is designated. Consequently, DFs in, e.g., the same layer of the IC card can share the security status, and the security status can be inherited even when a select command is executed.

In addition, the inheriting condition can be set for the inheritance of the security status. For example, the inheriting condition of the security status can be set in the FCI of a DF. Examples of the security condition (security status) as a target of inheritance are whether secure messaging can be performed, an authority obtained by the success of verify with an external apparatus, an authority obtained by the success of authentication with an external apparatus, the key for use in secure messaging, and the executing condition of secure messaging.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card comprising:
   a communication unit configured to perform data communication with an external apparatus;
   a data memory configured to store files managed by a hierarchical structure, a folder as an upper layer of the files, and information concerning inheritance of a security status between a plurality of folders; and
   a control element configured to set a first folder in an unselected state and set a second folder in a selected state after receiving a selection command when the selection command is received by the communication unit while the first folder is selected, configured to determine whether inheritance of the security status is possible when the second folder is selected, configured to invalidate the security status established while the first folder is selected when it is determined that inheritance of the security status is impossible, and configured to inherit a security status established while the first folder is selected when it is determined that inheritance of the security status is possible.

2. The card according to claim 1, wherein
   the data memory stores information concerning inheritance of a security status in control information of each folder, and
   the control element inherits, even while the second folder is selected, a security condition established while the first folder is selected, based on information concerning inheritance of a security condition contained in control information of the second folder.

3. The card according to claim 2, wherein
   the data memory stores information indicating an inheritance source of a security status in control information of each folder, and
   the control element inherits, even while the second folder is selected, a security condition established while the first folder is selected, if information indicating that the first folder is an inheritance source of the security condition exists in the control information of the second folder.

4. The card according to claim 1, wherein the data memory stores information concerning inheritance of a security status in control information of each folder, and
   the control element inherits, even while the second folder is selected, a security condition established while the first folder is selected, based on information concerning inheritance of a security condition contained in control information of the first folder.

5. The card according to claim 4, wherein
   the data memory stores information indicating an inheritance destination of a security status in control information of each folder, and
   the control element inherits, even while the second folder is selected, a security condition established while the first folder is selected, if information indicating that the second folder is an inheritance destination of the security condition exists in the control information of the first folder.

6. The card according to claim 1, wherein the security status is an authority obtained by success of one of authentication and verify from an external apparatus.

7. The card according to claim 2, wherein the security status is an authority obtained by success of one of authentication and verify from an external apparatus.

8. The card according to claim 4, wherein the security status is an authority obtained by success of one of authentication and verify from an external apparatus.

9. The card according to claim 1, wherein the security status is a key for use in secure messaging.

10. The card according to claim 2, wherein the security status is a key for use in secure messaging.

11. The card according to claim 4, wherein the security status is a key for use in secure messaging.

12. The card according to claim 1, wherein the security status is whether secure messaging can be performed.

13. The card according to claim 2, wherein the security status is whether secure messaging can be performed.

14. The card according to claim 4, wherein the security status is whether secure messaging can be performed.

15. The card according claim 1, wherein the control element executes an inheriting process based on a security status inheriting condition contained in information concerning inheritance of the security status.

16. The card according to claim 2, wherein the control element executes an inheriting process based on a security status inheriting condition contained in information concerning inheritance of the security status.

17. The card according to claim 4, wherein the control element executes an inheriting process based on a security status inheriting condition contained in information concerning inheritance of the security status.

18. The card according to claim 1, comprising:
a module including the communication unit, the data memory, and the control element; and
a main body including the module.

19. A portable electronic apparatus comprising:
a communication unit configured to perform data communication with an external apparatus;
a data memory configured to store files managed by a hierarchical structure, a folder as an upper layer of the files, and information concerning inheritance of a security status between a plurality of folders;
a control element configured to set a first folder in an unselected state and a second folder in a selected state after receiving a selection command when the selection command is received by the communication unit while the first folder is selected, configured to determine whether inheritance of the security status is possible when the second folder is selected, configured to invalidate the security status established while the first folder is selected when it is determined that inheritance of the security status is impossible, and configured to inherit a security status established while the first folder is selected it is determined that inheritance of the security status is possible.

20. A method of controlling an IC card, comprising:
setting a first folder in an unselected state and a second folder in a selected state after receiving a selection command, when the selection command is received while the first folder is selected;
checking whether information indicating inheritance of a security status from the first folder to the second folder exists in a memory;
determining whether the second folder can inherit the security status of the first folder when the second folder is selected;
invalidating the security status established while the first folder is selected when it is determined that the security status cannot be inherited; and
inheriting a security status established while the first folder is selected when it is determined that security status can be inherited.

* * * * *